United States Patent
Threlkeld (10) Patent No.: US 9,608,994 B2
(45) Date of Patent: Mar. 28, 2017

(54) CONTROLLING ADMINISTRATION RIGHTS

(71) Applicant: 1E Limited, London (GB)

(72) Inventor: Richard Threlkeld, Boca Raton, FL (US)

(73) Assignee: 1E Limited, London (GB)

( * ) Notice: Subject to any disclaimer, the term of this patent is extended or adjusted under 35 U.S.C. 154(b) by 0 days.

(21) Appl. No.: 14/521,131

(22) Filed: Oct. 22, 2014

(65) Prior Publication Data

US 2016/0119355 A1 Apr. 28, 2016

(51) Int. Cl.
*H04L 29/06* (2006.01)
*G06F 21/00* (2013.01)
*G06F 21/60* (2013.01)

(52) U.S. Cl.
CPC ............ *H04L 63/101* (2013.01); *G06F 21/00* (2013.01); *G06F 21/604* (2013.01); *H04L 63/10* (2013.01)

(58) Field of Classification Search
CPC ...... H04L 63/101; H04L 63/10; G06F 21/604
See application file for complete search history.

(56) References Cited

U.S. PATENT DOCUMENTS

| | | | |
|---|---|---|---|
| 2007/0288990 A1 | 12/2007 | Seiler et al. | |
| 2013/0097660 A1* | 4/2013 | Das | H04L 63/10 726/1 |
| 2014/0059651 A1* | 2/2014 | Luster | G06F 21/604 726/4 |

FOREIGN PATENT DOCUMENTS

EP 1868089 A1 12/2007

OTHER PUBLICATIONS

Lumension "Reducing local Admin exposure Through Application Whitelisting" Mar. 2011, pp. 1-5 https://www.lumension.com/Media_Files/Documents/Marketing---Sales/Whitepapers/Reducing-Local-Admin-Exposure-Through-Application-Whitelisting.aspx.*
Australian Government "Minimising Administrative Privileges Explained" Jun. 2011, pp. 1-2 https://citadel-information.com/wp-content/uploads/2012/08/minimising-administrative-privileges-australian-defense-2011.pdf.*
AppSense, "User Rights Management," Accessed on Oct. 16, 2014; http://www.appsense.com/media/9574180/urm_overview_us.pdf.
Australian Government, "Minimising Administrative Privileges Explained," Jun. 2011; http://citadel-information.com/wp-content/uploads/2012/08/minimising-administrative-privileges-australian-defense-2011.pdf.
Australian Government, "Minimising Administrative Privileges Explained," Accessed on Oct. 16, 2014; http://www.asd.gov.au/publications/csocprotect/minimising_admin_privileges.htm.

(Continued)

*Primary Examiner* — Jung Kim
*Assistant Examiner* — Carlos M De Jesus Lassala
(74) *Attorney, Agent, or Firm* — EIP US LLP (57) ABSTRACT

A computer in a network has an operating system. The operating system is configured to prevent running of software not identified in a list of approved software referred to as a white list. Software absent from the list is prevented from running by the operating system. The network has a server which determines, for each item of software on the white list, the administration rights of the users of computers having that item of software. If a white listed software item is present on one or more computers used by users without admin rights, then the admin rights of any user of other computers having the same white listed software item are withdrawn by instructions sent by the server to the computer.

10 Claims, 7 Drawing Sheets

(56) References Cited

OTHER PUBLICATIONS

Canadian Government, "Minimising Administrative Privileges Explained," Accessed on Oct. 16, 2014; http://www.cse-cst.gc.ca/its-sti/publications/itsb-bsti/itsb94-eng.html.
Internet Storm Center, "InfoSec Handlers Diary Blog," Accessed on Oct. 16, 2014; http://isc.sans.edu/diary/Cyber+Security+Awareness+Month+-+Day+30+-+DSD+35+mitigating+controls/14419.

* cited by examiner

CONTROLLING ADMINISTRATION RIGHTS

BACKGROUND OF THE INVENTION

Field of the Invention

The present invention relates to controlling administration rights of computers in a network.

Description of the Related Technology

It is known to perform bench marking to ensure computer systems are secure. The US government, the Australian Government and Microsoft consider that four security controls mitigate against a large proportion of software intrusions. The four controls are 1) apply Operating System patches;
2) apply third party software patches;
3) allow only applications on a "white list" (i.e. a list of allowed or approved software), to run; and
4) limit administrator privileges.

A network of computers may have tens, or even hundreds or more, of computers and each computer may have a large number of programs installed on it. Also many users may have administrator rights granted for their computer. Some users may install software on their computers independently of the network management system. Also computers, for example laptop computers join and leave the network at random. To manually apply the controls to an existing network is a very difficult if not impossible task. The number of different application programs and different versions of the same program installed on a network is often very large. There is a need to provide software tools for controlling what software is allowed to run and who has administrator rights.

SUMMARY

In accordance with a first embodiment of the present invention, there is provided a method of controlling computers in a network, the network having a network management system storing data identifying the computers present in the network and the software present in the network, each computer having an operating system, the operating system storing data relating to administration rights, the method comprising running on the network a suite of control programs which i) identifies software present on the computers, whether the software is approved for use and the administration rights of the users of those computers, ii) determines, for each instance of the same software which is approved for use installed on different computers, whether the users of those computers have administration rights, and iii) if at least one such user does not have administration rights, causes the operating system of the other computer(s) to withdraw the administration rights of the user(s) of said same software on the other computer(s).

According to a second embodiment of the invention, there is provided comprising computer program comprising computer-executable instructions which may be stored on one or more non-transitory computer readable media and which, when executed by a processor, cause a computing device to perform a method of controlling computers in a network, the network having a network management system storing data identifying the computers present in the network and the software present in the network, each computer having an operating system, the operating system storing data relating to administration rights, the method comprising:

i) identifying software present on the computers, whether the software is approved for use and the administration rights of the users of those computers, ii) determining, for each instance of the same software which is approved for use installed on different computers, whether the users of those computers have administration rights, and iii) if at least one such user does not have administration rights, issues instructions for causing the operating system of the or each other computer to withdraw the administration rights of the user(s) of said same software on the other computer(s).

According to a third embodiment of the invention, there is provided a network having a network management system storing data identifying the computers present in the network and the software present in the network, each computer having an operating system, the operating system storing data relating to administration rights, a computers of the network having a suite of control programs which i) identifies software present on the computers, whether the software is approved for use and the administration rights of the users of those computers, ii) determines, for each instance of the same software which is approved for use installed on different computers, whether the users of those computers have administration rights, and iii) if at least one such user does not have administration rights, causes the operating system of the other computer(s) to withdraw the administration rights of the user(s) of said same software on the other computer(s).

According to a fourth embodiment of the invention, there is provided a computer program comprising computer-executable instructions which may be stored on one or more non-transitory computer readable media and which, when executed by a processor of a computing device, cause the computing device to perform a method of administering administration rights of other computers in a network, the network having a network management system storing data identifying the computers in the network and the software on the computers, each computer having an operating system, the operating system storing data relating to the administration rights, the method comprising:

i) identifying software present on the computers, whether the software is approved for use and the administration rights of the users of those computers, ii) determining, for each instance of the same software which is approved for use installed on different computers, whether the users of those computers have administration rights, and iii) If at least one user of approved software does not have admin rights, add to a report the identity of each other user of same software who does have admin rights and the identity of their computer.

According to a fifth embodiment of the invention, there is provided a method of administering administration rights of computers in a network, the network having a network management system storing data identifying the computers in the network and the software on the computers, each computer having an operating system, the operating system storing data relating to the administration rights, the method comprising the use of a computing device coupled to the network to:

i) identify software present on the computers, whether the software is approved for use and the administration rights of the users of those computers, ii) determine, for each instance of the same software which is approved for use installed on different computers, whether the users of those computers have administration rights, and iii) If at least one user of approved software does not have admin rights, add to a report the identity of each other user of same software who does have admin rights and the identity of their computer.

In embodiments of the invention, the software approved for use is identified in lists of approved software referred to herein after as "white lists". A white list may be created in any suitable way. Ways of creating white lists are known in the art. One way is to manually create such a list. An illustrative embodiment of the invention described hereinafter uses an inventive automatic process for producing a white list.

Further features and advantages of the invention will become apparent from the following description of illustrative examples of the invention, given by way of example only, which is made with reference to the accompanying drawings.

DETAILED DESCRIPTION OF CERTAIN INVENTIVE EMBODIMENTS

Figure 1:
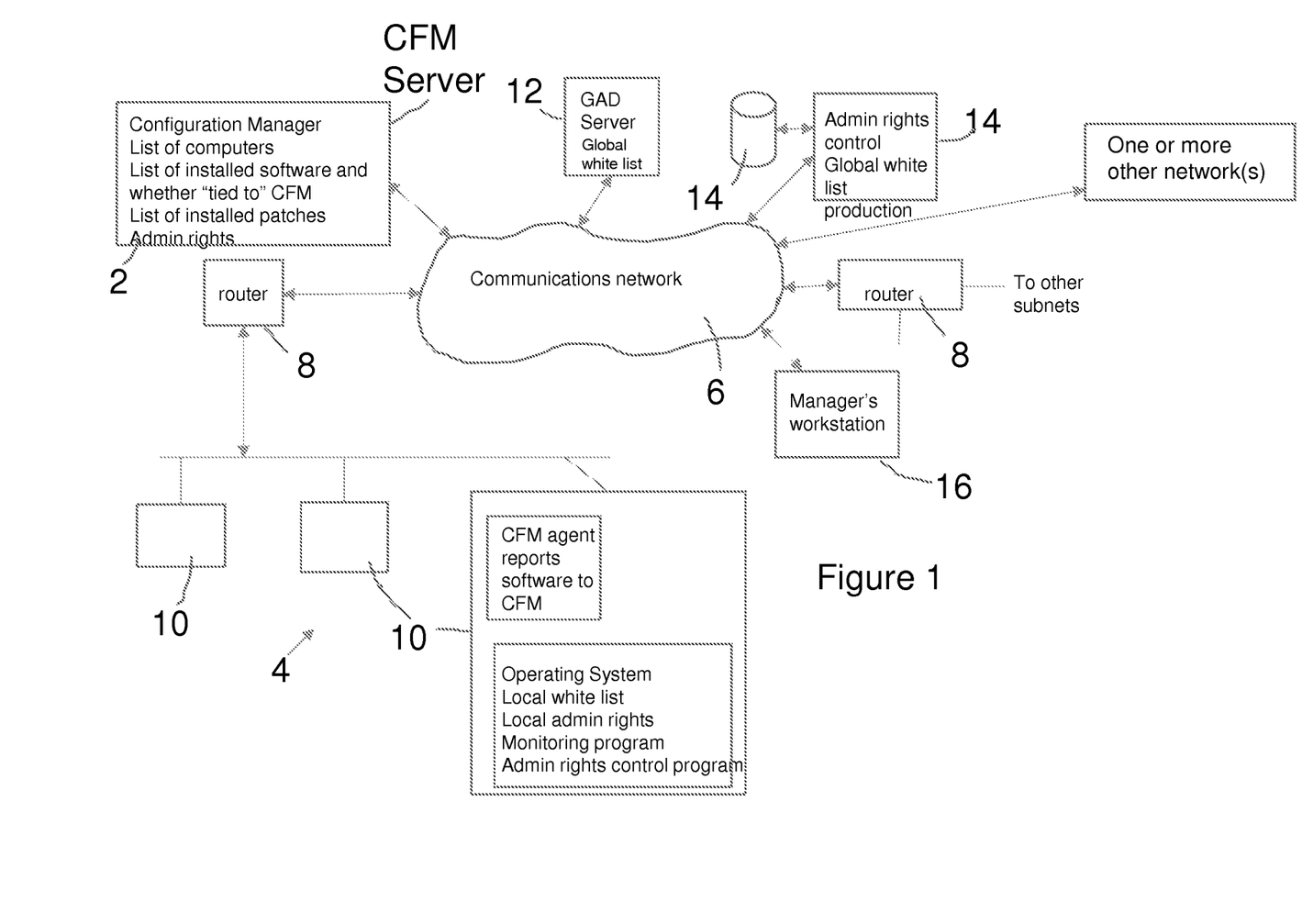
FIG. 1 is a schematic diagram of a computer network.

FIG. 1 illustrates an example of a network in which the present invention may be used, but those skilled in the art will appreciate the invention may be used in other networks.

The network of FIG. 1 comprises a network manager, in this example a Microsoft Configuration Manager (CFM) 2 coupled to one or more sub-networks or network branches 4 by a communications network 6 via one or more routers 8. Each sub-network 4 comprises one or more computers 10 referred to herein as local computers. Other examples of network managers are available from other companies. The computers 10 may be of different types for example desk top computers and laptops amongst others. Portable computers such as laptops may be connected to the network only temporarily.

Each computer 10 has at least an operating system, applications software and a CFM agent. The CFM agent communicates with the CFM 2 informing the CFM 2 in known manner of software installed on the computer. Software may be installed on a computer 10 using the network manager, for example using Microsoft Installer. The Configuration Manager CFM 2 stores data relating to the computers 10 and the software installed on them including data identifying the computers, data identifying the software, including patches, installed on them, and other data as will be described in more detail below. Each computer 10 stores a local list of allowed or approved software hereinafter referred to as a "white list".

A computer 14, which may be a server, is connected to the network. The server 14 produces the local white lists for storage in the local computers 10. The server 14 automatically creates and updates each white list based on a metric calculation as will be described with reference to FIG. 5. The local computers 10 each have a monitoring program which sends data to the server to enable it to produce the local white lists.

The network of FIG. 1 also includes a computer, e.g. a server, 12 on which is a Global Active Directory (GAD). That computer 12 stores a global white list which is enforced on the local computers 10 as a policy. The CFM server 2, the GAD server 12 and the server 14 form a network management system.

The kernel of the operating system of each local computer 10 interacts with the local white list and with the GAD server in known manner to prevent running of software absent from the combination of the local and global white lists.

The network of FIG. 1 is in a domain. The server 14 maybe outside the network of FIG. 1 but connected to the network of FIG. 1. It may be connected to one or more other networks by the communications network 6 but outside their domains to provide the same monitoring service to all the networks.

The network may also have one or more workstations 16 used by one or more network managers.

Figure 2:
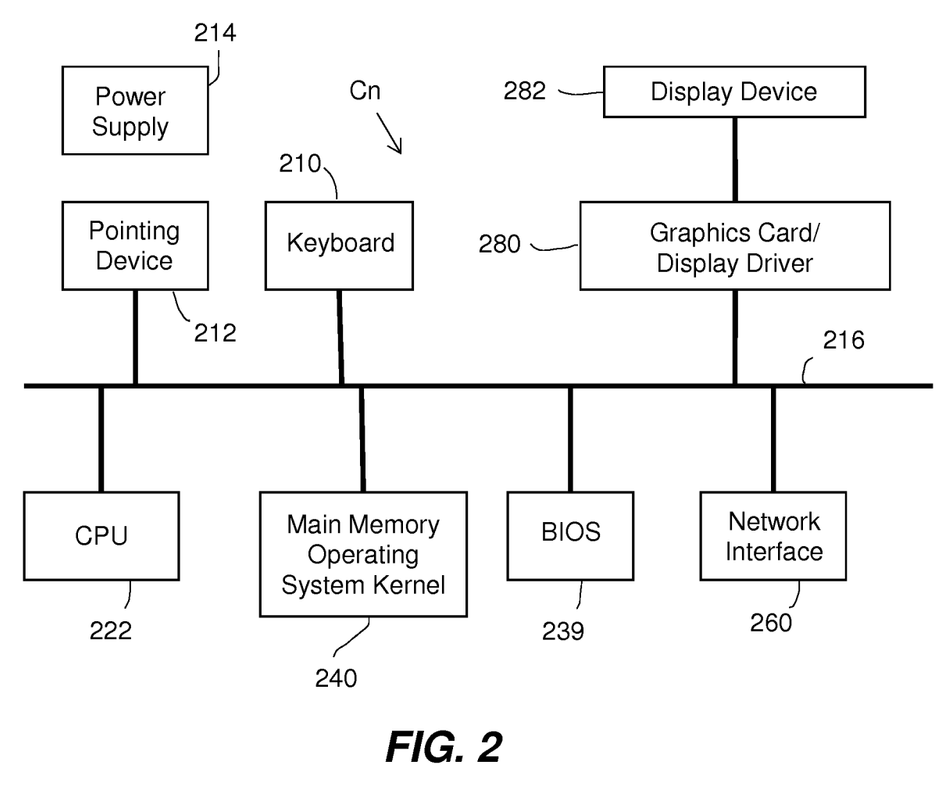
FIG. 2 is a schematic diagram of an illustrative computer of the network of FIG. 1.

Referring to FIG. 2, an illustrative one of the computers 2, 10, 12, 14 and 16 comprises, amongst other items: a CPU 222; a main memory 240 for example a hard disk drive or other storage device, for example electronic memory; a network interface 260, a BIOS 239 and one or more busses 216. The BIOS 239 is typically a Read Only Memory (ROM). The computers may also have other items for example a display driver 280 coupled to a display device 282; human interface devices or input devices for example a keyboard 210 and a pointing device 212. The items are conventional and interact via the bus(es) 216 in a conventional way. The network interface couples the computer to the communications network 6 via the routers 10 and to other computers in the sub-network 4 having respective IP (Internet Protocol) addresses. The computer also comprises a power supply 214. Programs are stored in the main memory 240 and executed by the CPU 222. The computer has an operating system the lowest (and most important) level of which is the kernel of the operating system. In this example the operating system is stored in the main memory.

Control of Administration Rights

Software may be installed on a computer 10 by the user if the user has administration rights (referred to as admin rights) which allow that. Admin rights data defining the admin rights of a user are stored in the operating system. One computer may have two or more users with different admin rights; for example network administrators may have more extensive rights to make changes to software on a computer than the day-to-day user of the computer. The administration rights of a day-to-day user, who is allowed only to make changes to his or her computer, are referred to as local rights. The following example relates to control of local rights.

Figure 3:
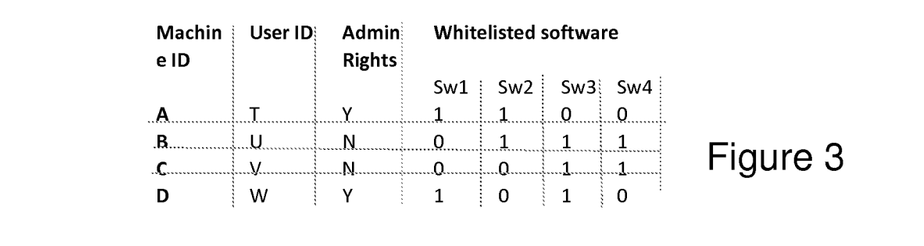
FIG. 3 is a schematic data table showing an illustrative example of the administration rights of users of computers of the network, the software present on the computers and white list status according to one or more embodiments of the present invention.

The server 14 acts in this example, as an admin rights control server. It receives, via the communications network 6, from the monitoring program on each local computer, data identifying the admin rights of the users of the computers. Alternatively, data relating to admin rights may be available from the configuration manager via the communications network 6; data relating to admin rights may be entered into the configuration manager automatically in known manner. The server also gathers data, for example from the configuration manager, identifying the software present on the computers. In this example, the server 14 constructs a data table in a manner known in the art.

In FIG. 3 is an illustrative example of the data table in which the computers are identified as A to D, users as T to W and software as Sw1 to Sw4. "1" indicates software present and "0" indicates absence of software. "Y" means yes and "N" means no. The data table of FIG. 3 is simplified for clarity of explanation. There may be any number of computers and users in a network and each computer may have any number of software packages present on the computer.

Referring to FIG. 3, in accordance with one embodiment of the present invention, if one or more white listed software packages Sw1 to Sw4, e.g. application programs, are present on one or more computers used by users without admin rights, then the local admin rights of any user of other computers having at least one of the same white listed software package(s) are withdrawn.

The server 14 has a program which determines whether or not admin rights should be withdrawn from a computer 10 in the network. If it determines that admin rights should be withdrawn from a computer it sends instructions via the communications network 6, to a local admin rights control program at the computer 10, and the control program interacts via an API (Application Program Interface) with the operating system on the computer to withdraw the admin rights.

By way of explanation, consider each of columns Sw1 to Sw4 in isolation as if the other columns Sw1 to Sw4 did not exist. Referring to the column Sw1 in FIG. 3, only computers A and D have software Sw1 and all users of software Sw1 have admin rights. Thus the admin rights would be maintained unchanged. Referring to the column Sw2 in FIG. 3, only computers A and B have software Sw2 and user U of computer B does not have admin rights, therefor the admin rights of user T of computer A would be removed. Referring to the column Sw3 in FIG. 3, computers B, C and D have software Sw3 and users U and V do not have admin rights so the admin rights of user W would be removed. Referring to the column Sw4 in FIG. 3, only computers B and C have software Sw4 but there are no users with admin rights, so no change would be made to the absence of admin rights.

Figure 4:
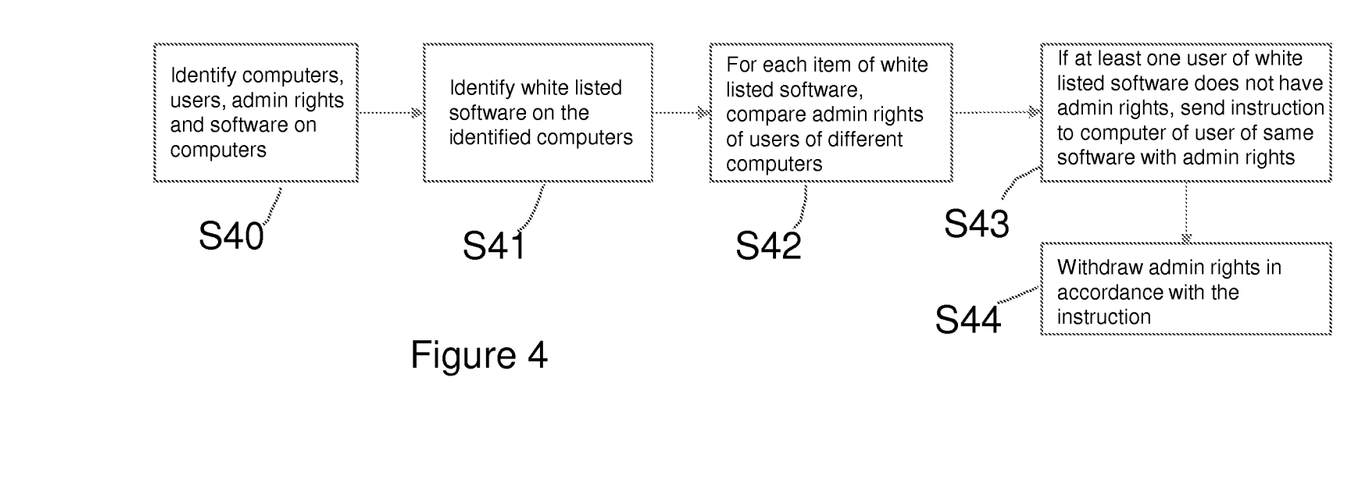
FIG. 4 is a flow chart of an illustrative method of controlling administration rights in the network of FIG. 1 according to one or more embodiments of the present invention.

In the more realistic scenario that the computers A to D collectively have all of software Sw1 to Sw4 as shown on FIG. 3, the admin rights of user T would be withdrawn because user U of Software Sw1 does not have admin rights and the admin rights of user W would be withdrawn because user U, and/or user V, of Software Sw3 does not have admin rights. FIG. 4 is a flow chart of an illustrative method of controlling administration rights in the network of FIG. 1. In step S40, the server 14 of the network of FIG. 1 identifies the computers 10 on the network, the users of the computers 10 and the local admin rights of the user's computers. That is done using data from data provided by the CFM 2 and/or from the monitoring programs on the computers 10. The server 14 also identifies in step S41 the white listed software on the identified computers 10, using data from the GAD 12 and/or white list data available at the server 14 as described above. Step S42, for each item of whitelisted software, compares the admin rights of users of that software on different computers. Step S43 uses the results of the comparison. In step S43, if one or more white listed software packages e.g. Sw1 to Sw4, are present on a computer 10 used by a user without admin rights, then an instruction is sent by the server 14, via the communications network 6, to the computer 10 of a user, having admin rights, of the same white listed software package(s). The instructions are received by the local admin rights control program of the computer 10. In step S44, the local admin rights control program receiving the instruction interacts with the operating system of the computer 10 and withdraws the local admin rights.

Production and Use of White Lists

Figure 5:
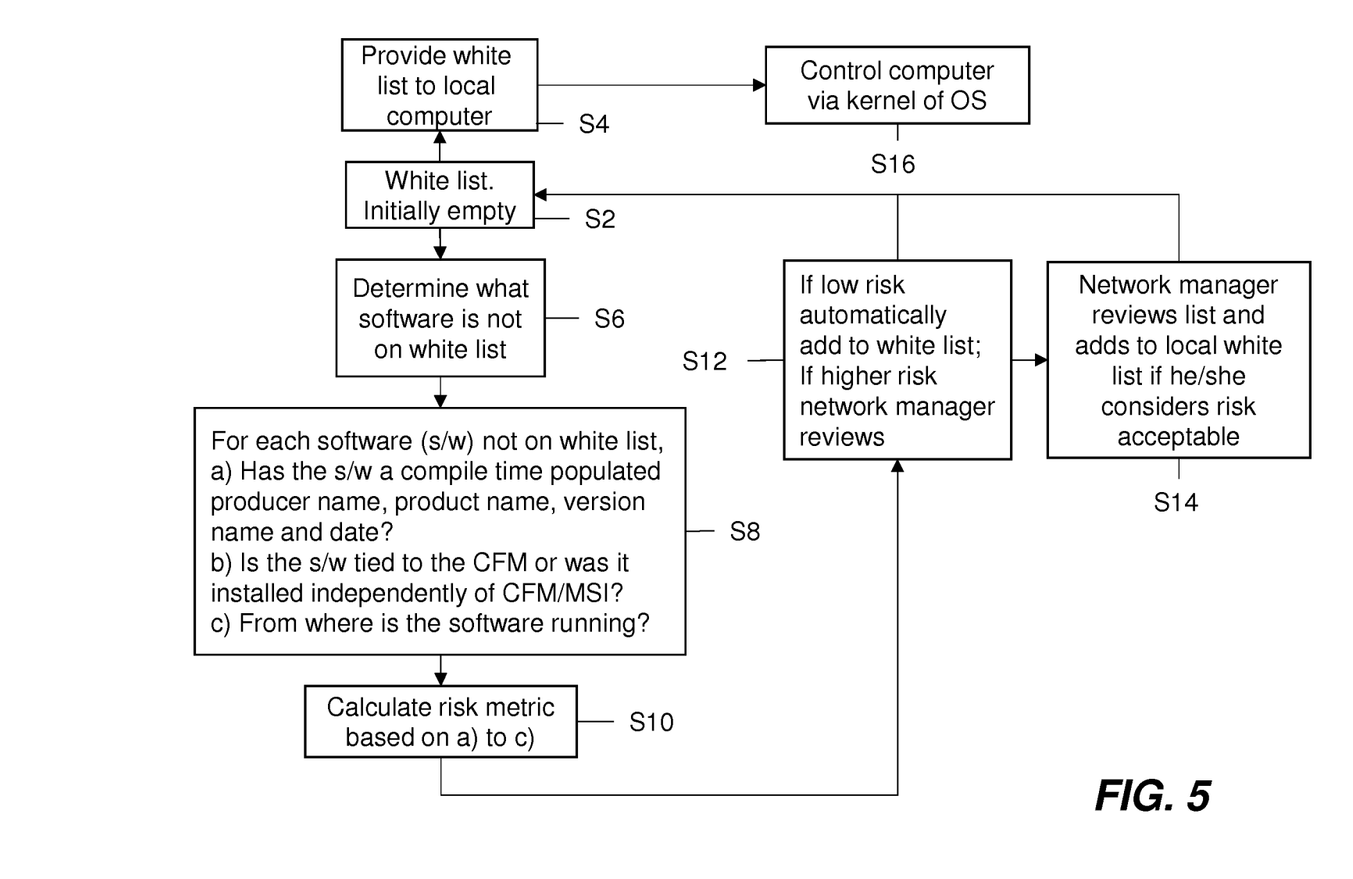
FIG. 5 is a flow chart of an illustrative method of creating and/or amending a list of allowed software and controlling the running of software in accordance with the list.

FIG. 5 is a flow chart of an illustrative method of creating and/or amending a white list and controlling a computer 10. The method of FIG. 5 is implemented by a program installed in the server 14 which receives data sent to it by the monitoring program of the computer 10. The operating system in each local computer 10 allows only software listed in the combination of the local white list and the global white list to run on the local computer. The program may be run continuously or at intervals to maintain the white list in case software installed on the computer changes. The server 14 runs the program for each of the local computers 10.

Assume as shown at S2 in FIG. 5 that the local white list for a particular local computer 10 is initially empty. In the following description, "software" means any software which is not core operating system software. The white list program at step S6 compares the (initially empty) white list with the identities of software installed in the computer 10. Initially this will be all software stored on the computer. At step S8, in this example, for each software not on the white list the white list program determines a) Has the software i) a producer name, ii) a product name, iii) a version name and iv) a date, (in all four cases i) to iv) established at compile time);

b) Is the software i) tied to the CFM or ii) was it installed independently of the CFM and/or the installer;

c) Where is the software running from? For example it may run from i) the program files memory (main memory) of a computer 10 or ii) from a user temp directory or iii) from the network.

Item b) may be omitted from some implementations. It is described in more detail with respect to FIG. 7.

A risk metric is calculated in step S10. The metric applies to each of the criteria of a)i) to c)iii) a confidence factor which may be weighted. For example the metric M may be $$M = w1a)i) + w2a)ii) + w3a)iii) + w4a)iv) + w5b)i) - w6b)ii) + w7c)i) - w8c)ii) - w8c)iii)$$

Where w1 to w8 are weighting factors, which could be one, and a)i) to c)iii) are confidence values relating to the like numbered criteria set out above. In this example, the greater the metric, the lower the risk of running the software.

As indicated at S12 software which has a metric greater than a predetermined value is automatically added to the white list.

The white list is provided by the server 14 to the local computer 10 at step S4. The kernel of operating system of the computer allows S16 only software listed in the local white list and in the global list to run. In one example, if the software is not on the combination of local and global white lists, a message is automatically generated informing the user that the software is not on the white lists and the software is prevented from running.

A message identifying software having a higher risk is provided to the network manager for review as at step S14. The message may also include the calculated risk factor. In one example if the risk is deemed medium, the message is sent to one manager or group of managers authorized to review and take decisions on medium risk software and if the risk is deemed high, the message is sent to another manager or group of managers authorized to review and take decisions on high risk software.

The relevant manager may request information from the user of the medium or high risk software. For example the manager may ask the user to provide license information. If the user has downloaded the software from a website, the manager may ask for the URL of the website.

If a manager is deems software referred to him is allowable the manager adds it to the local white list at step S14.

The steps S2 to S14 may be repeated continuously or regularly or at suitable intervals to maintain the white lists as software installed on the computer 10 changes over time.

Step S8 lists criteria a)i) to c) iii). However other criteria may be used instead of those or in addition to those. Examples of other criteria which may be used include Has the software a certificate issued by a trusted certificate authority?

Has the software a product code applied by an installer, for example Microsoft Installer?

Global White List

Figure 6:
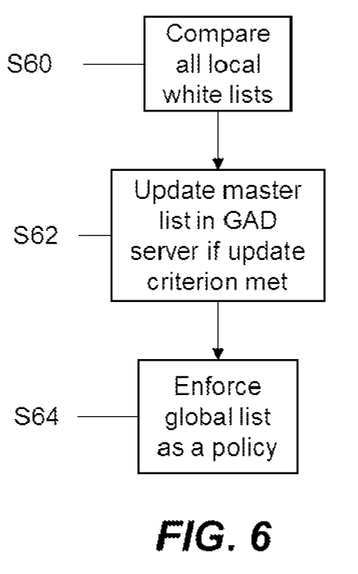
FIG. 6 is a flow chart of an illustrative method, used in combination with the method of FIG. 5, of globally monitoring and updating lists of allowed software according to one or more embodiments of the present invention.

The server 12 having the global active directory stores a global white list. Referring to FIG. 6, the server 14 compares S60 all the local white lists it produces. The server 14 has a global assessment program which calculates for each software item on the local white lists the percentage of local white lists listing that software. If a predetermined percentage X %, (for example 30% or any other suitable proportion), of white lists include a particular software, it is added S62 automatically to the global white list in the GAD server. The global white list in the GAD server is enforced S64 on the local computers 10 as a policy.

Cfm Database

Figure 7:
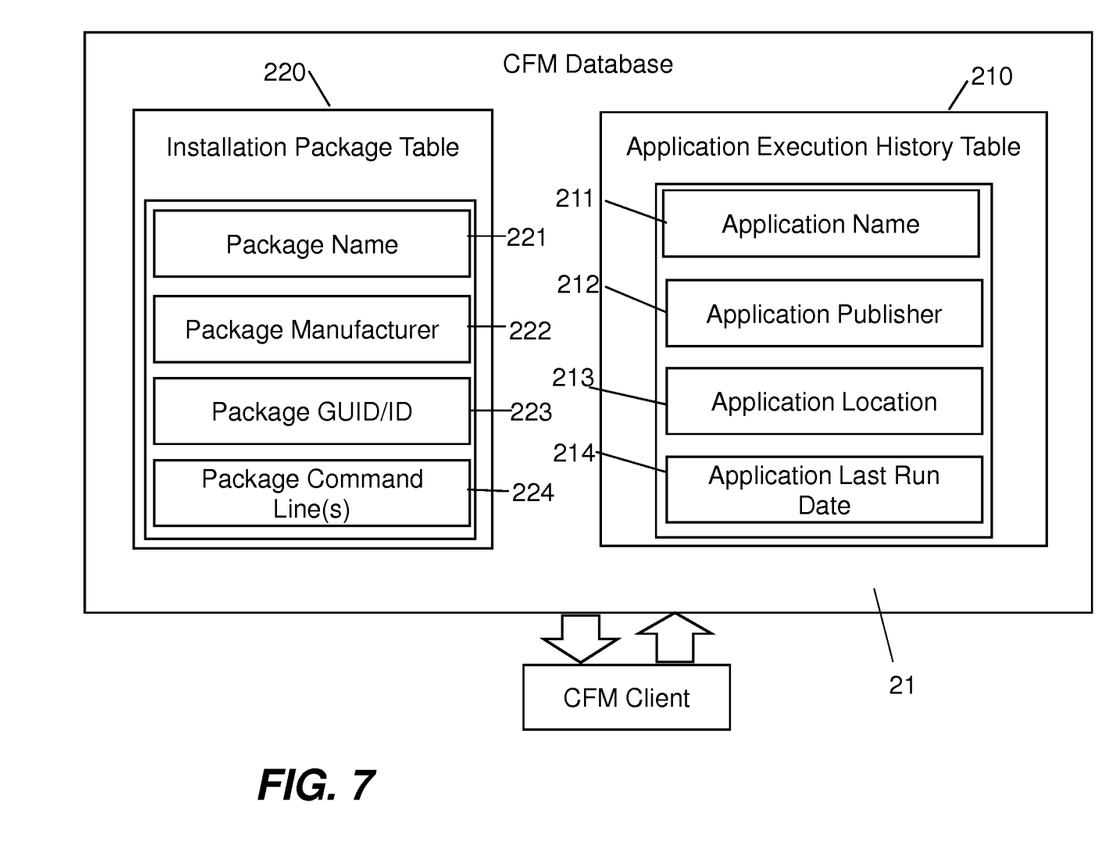
FIG. 7 illustrates part of a Configuration Manager according to one or more embodiments of the present invention.

FIG. 7 illustrates part of a Configuration Manager. The CFM database 21 has an application execution history table containing the execution history 210 for different Applications that have run on client systems. This history is created automatically and is part of the standard inventory process. The database holds the metadata for each system and its Application launch history such as the Name and Version 211, and Publisher 212 which it reads from the binary data of the Application. Additionally this contains the location 213 on the client system that the Application was run from and the date/time 214 this took place.

The CFM database also has an installation package table 220. The installation package table 220 stores data relating to 'packages' used for installing software on domain systems. Administrative staff create these Packages over time. The database holds metadata for each package such as the Name 221, Manufacturer 222, version, GUID (unique identifier) 223 and command lines 224 for installing or uninstalling the software.

The software for determining whether an application is tied to the CFM_compares the fields from the two package tables of the database and assigns confidence levels (low, medium and high) on the number of matches from fields in the Application and fields in all the Packages. If all fields match exactly there is high confidence, if only a couple match there is medium confidence and no matches means low confidence.

The CFM data base may also contain data identifying local admin rights.

Programs

Examples as described herein may be implemented by a suite of computer programs which are run on one or more computer devices of the network. For example, a computer program run on a server computer device 14 may implement steps S40 to S43 of the method of FIG. 4 and step S44 may be implemented by a program run on a computer 10 of the network. Likewise the steps of the method of FIG. 5 may be implemented at least by the server 14 and the computers 10. It will be appreciated the programs for implementing the methods of FIGS. 4 and 5 may also involve inter-acting with other programs for instance the programs of the CFM2 and the local monitoring programs and operating systems of the computers 10. Software provides an efficient technical implementation that is easy to reconfigure; however, other implementations may comprise a hardware-only solution or a mixture of hardware devices and computer programs. One or more computer programs that are supplied to implement the invention may be stored on one or more carriers, which may also be non-transitory. Examples of non-transitory carriers include a computer readable medium for example a hard disk, solid state main memory of a computer, an optical disc, a magneto-optical disk, a compact disc, a magnetic tape, electronic memory including Flash_memory, ROM, RAM, a RAID or any other suitable computer readable storage device.

The term "software" as used herein refers to any tool, function or program that is implemented by way of computer program code other than core operating system code. In use, an executable form of the_computer program code is loaded into memory (e.g. RAM) and is processed by one or more processors. "Software" includes, without limitation: non-core operating system code; application programs; patches for, and updates of, software already installed on the network; and new software packages.

The above embodiments are to be understood as illustrative examples of the invention. Further embodiments of the invention are envisaged. Whilst for example the configuration manager, Global Active Directory and the admin rights control have been described as implemented by computers 2, 12 and 14 respectively, they may be implemented by one or more other computers. Applications automatically added to the white list because they are deemed to be of low risk may be reviewed by network managers and subsequently removed if the managers decide they are of higher risk. Other ways, known in the art, may be used to create a white list; for example a white list may be compiled manually.

Examples described above automatically withdraw admin rights by interacting with the operating system of a computer 10. In another implementation, the control program produces a report identifying those computers having white listed software packages and their users having local admin rights of computers when users of other computers have the same software without admin rights. The report may be used by network managers to decide whether or not to withdraw local admin rights from users of white listed software. The network managers may withdraw local admin rights by sending instructions to the control program of a computer. The control program interacts with APIs (Application Program Interfaces) in the operating system on the computer to withdraw the admin rights.

Figure 8:
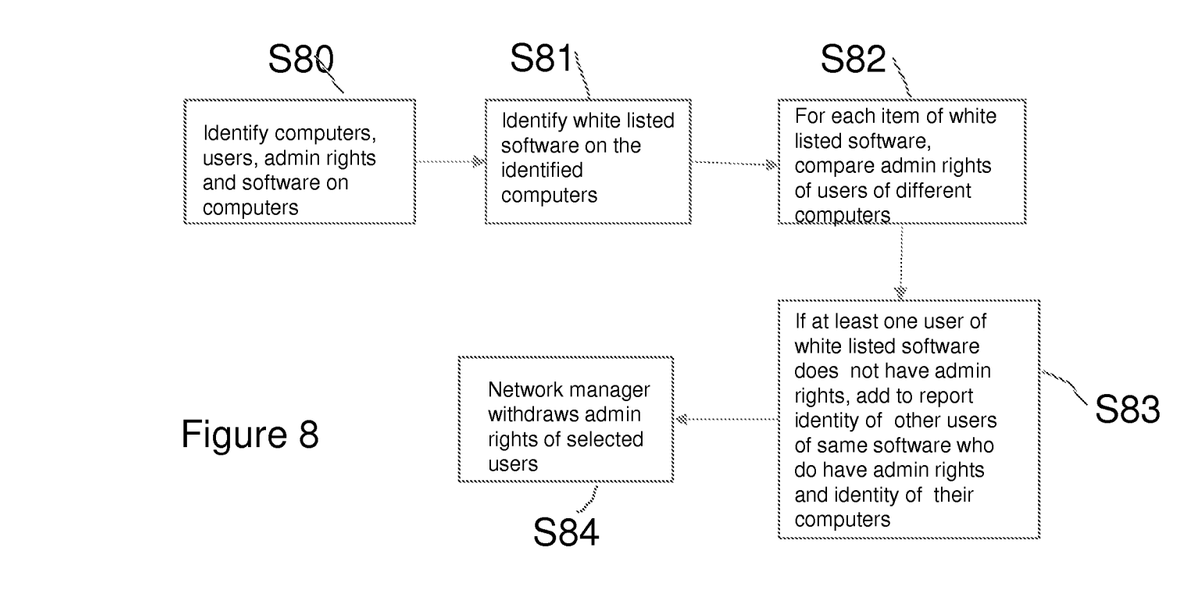
FIG. 8 is a flow chart of an illustrative method of administering administration rights in the network of FIG. 1 according to one or more embodiments of the present invention.

FIG. 8 is an illustrative flow chart of an illustrative method of administering administration rights in the network of FIG. 1. In step S80, the server 14 of the network of FIG. 1 identifies the computers 10 on the network, the users of the computers 10 and the local admin rights of the user's computers. That is done using data provided by the CFM 2 and/or from the monitoring programs on the computers 10. The server 14 also identifies in step S81 the white listed software on the identified computers 10, using data from the GAD 12 and/or white list data available at the server 14 as described above. In step S82, for each item of whitelisted software, the server 14 compares the admin rights of users of that software on different computers. Step S83 uses the results of the comparison. If at least one user of white listed software does not have admin rights, step S83 adds to a report the identity of each other user of same software who does have admin rights and identity of their computer 10. The report may be sent to, or accessed from, a workstation 16 used by a network manager via the communications network 6. In step S84 the report is reviewed by the network manager and the network manager may withdraw local admin rights from a user. The manager may do that by sending, via the communications network 6, program instructions to the local admin rights control program of the user's computer 10.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

I claim:

1. A method of controlling computers in a network, the network having a network management system storing data identifying the computers present in the network and the software present in the network, each computer having an operating system, the operating system storing data relating to administration rights, wherein said administration rights are local administration rights, the method comprising:
identifying, by a suite of control programs, software present on the computers, whether the software is approved for use, and the administration rights of the users of the computers;
determining, by the suite of control programs, for each instance of the same software which is approved for use and installed on different computers, whether the users of the different computers have administration rights; and
in response to a determination that at least one such user does not have administration rights, interacting, by the suite of control programs, with the operating system of the different computers of the users of the said same software to withdraw the administration rights of the users on the different computers who do have administration rights.

2. A method according to claim 1, wherein data identifying local administration rights is stored in the network management system.

3. A method according to claim 1, wherein data identifying whether software is approved for use is stored in the network management system.

4. A method according to claim 1, wherein data identifying whether software is approved for use is stored on said computers.

5. A method according to claim 1, wherein the control programs include a local administration rights control program installed on each said computer and which interacts with the operating system to withdraw administration rights.

6. A method according to claim 1, wherein the operating system of each computer prevents non-approved software from running.

7. A non-transitory computer-readable medium comprising computer-executable instructions which, when executed by a processor, cause a computing device to perform a method of controlling computers in a network, the network having a network management system storing data identifying the computers present in the network and the software present in the network, each computer having an operating system, the operating system storing data relating to administration rights, wherein said administration rights are local administration rights, the method comprising:
identifying software present on the computers, whether the software is approved for use, and the administration rights of the users of the computers;
determining, for each instance of the same software which is approved for use and installed on different computers, whether the users of the different computers have administration rights; and
in response to a determination that at least one such user does not have administration rights, issuing instructions for interacting with the operating system of the different computers of the users of the same software to withdraw the administration rights of the users on the different computers who do have administration rights.

8. The non-transitory computer-readable medium of claim 7, wherein the method of controlling computers in the network further comprises: in response to the determination that at least one user of approved software does not have administration rights, adding to a report the identity of each of the users of same software who does have administration rights and the identity of their computer.

9. A network having a network management system storing data identifying one or more computers present in the network and software present in the network, each computer having an operating system, the operating system storing data relating to administration rights, wherein said administration rights are local administration rights, the network comprising:
at least one processor;
at least one memory including a suite of control programs, the at least one memory and the suite of control programs being configured to, with the at least one processor, cause the system to:
identify software present on the computers, whether the software is approved for use, and the administration rights of the users of the computers;

determine, for each instance of the same software which is approved for use and installed on different computers, whether the users of the different computers have administration rights; and in response to a determination that at least one such user does not have administration rights, interact with the operating system of the different computers of the users of said same software to withdraw the administration rights of the users on the different computers who do have administration rights.

10. The network of claim 9, wherein the at least one memory and the suite of control programs are further configured to, with the at least one processor, cause the system to: in response to the determination that at least one user of approved software does not have administration rights, add to a report the identity of each of the users of the same software who does have administration rights and the identity of their computer.

\* \* \* \* \*